July 9, 1929. J. HOJNOWSKI 1,720,330
AEROPLANE
Filed Sept. 6, 1927  2 Sheets-Sheet 1

Inventor
Jakob Hojnowski

July 9, 1929. J. HOJNOWSKI 1,720,330
AEROPLANE
Filed Sept. 6, 1927  2 Sheets-Sheet 2

Inventor
Jakob Hojnowski

Patented July 9, 1929.

1,720,330

UNITED STATES PATENT OFFICE.

JAKOB HOJNOWSKI, OF NEKOOSA, WISCONSIN.

AEROPLANE.

Application filed September 6, 1927. Serial No. 217,683.

This invention relates to improvements in aeroplanes, particularly in the planes or wings thereof, and it is the principal object of my invention to provide a plane tilting arrangement allowing a tilting of the plane at any desired angle to the body without interfering with the latter in order to assist in the proper operation of the aeroplane, particularly in steering, rising or descending and turning.

Another object of my invention is the provision of a tilting means for the planes of aircraft of simple and inexpensive construction, yet durable and efficient in its operation.

A further object of my invention is the provision of a tilting arrangement for the wings or planes of aircraft which can be readily manipulated from the body of the machine without interference with the other apparatus used to properly maneuver the aeroplane.

These and other objects and advantages of my invention will become more fully known as the description thereof proceeds, and will then be specifically defined in the appended claims.

In the accompanying drawing, forming a material part of the disclosure:

Figure 1:
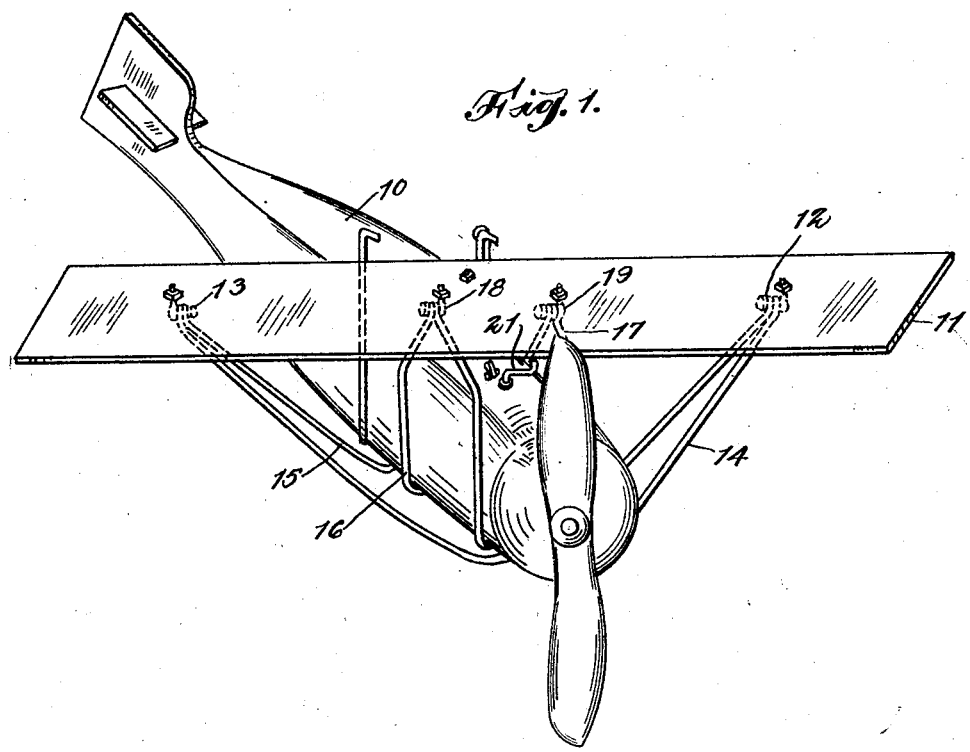
Figure 1 is a perspective view of an aeroplane constructed according to my invention.
Figure 2:
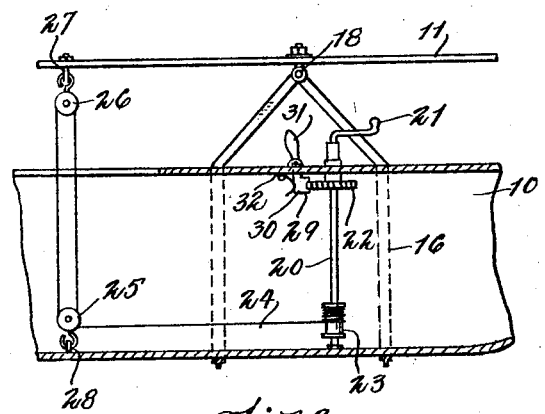
Figure 2 is a fragmentary side elevation thereof, partly in section.
Figure 3:
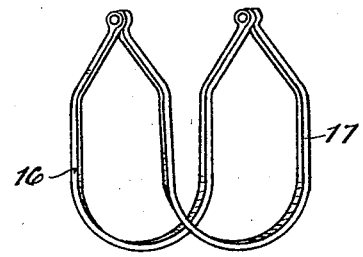
Figure 3 is a detail view of a pair of plane tilting straps.

As shown on the drawing, Figures 1 to 3, an aeroplane 10 of any type, preferably monoplane has its plane 11 tiltably secured by means of the swivel joints 12, 13 to the fuselage 14, 15, while a pair of straps or hangers 16, 17 guided about the body of the plane have the plane 11 tiltably connected to their upper ends, as at 18, 19.

A substantially vertical rod 20 journaled in the aeroplane body carries at the top thereof a crank handle 21, while within the body near the top thereof said rod has a gear 22 secured thereto, and near the bottom said rod carries a pulley 23 or the like about which a cable 24 is wound, having its outer end guided over pulleys 25 and 26 in the manner of a tackle arrangement, the upper pulley 26 of which is suspended from a hook 27 secured in the plane 11 near one end thereof, and the lower pulley, 25, is hooked to an eye 28 in the bottom of body 10.

A pawl 29 engages the gear 22 and is held in engaged position by the spring 30, while a handle 31 on the pawl, pivoted intermediate its ends, as at 32 to the aeroplane body effects the operation of said pawl.

It will be clear from the above description, that the plane 11 may be tilted endwise at any angle to the body by the proper manipulation of the tackle arrangement by means of handle 21 and be locked in the adjusted position by means of the engagement of pawl and gear.

Figure 4:
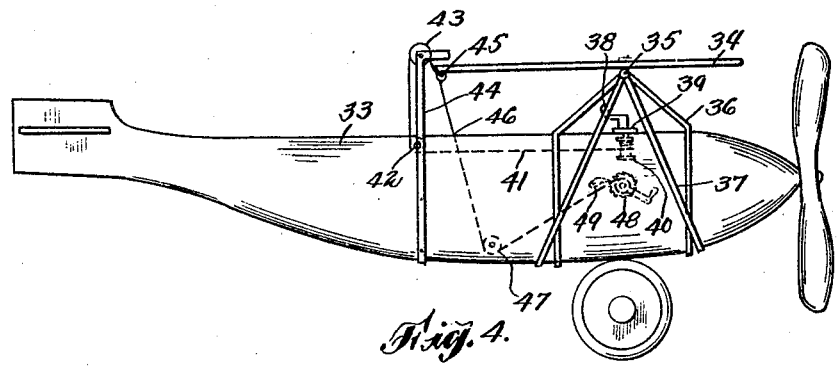
Figure 4 shows an aeroplane in side view equipped with a modified form of plane tilting means.

In the form of my invention illustrated in Figure 4, the aeroplane 33 has its plane 34 tiltably attached intermediate its ends, as at 35, to the strap arrangement 36, 37 and the tilting of the plane is effected by means of a handle 38 at the upper end of a vertical rod 39 carrying within the body of the aeroplane a pulley 40 about which a cable 41 is guided which is also guided over pulleys 42, 43 on a post 44 attached to the body 33, and the outer end of a cable 41 is attached to the end of plane 34, as at 45.

Another cable 46 is also attached with its end to the plane 34, and is guided over a pulley 47 near the bottom of body 33, and over a pulley 48 on a horizontally disposed shaft adapted to be operated by a crank handle 49.

It will be clear that by the proper manipulation of handle 38, the plane 34, can be tilted at any desired angle to the body, while by means of the crank 49, it may be returned into its normal position.

Figure 5:
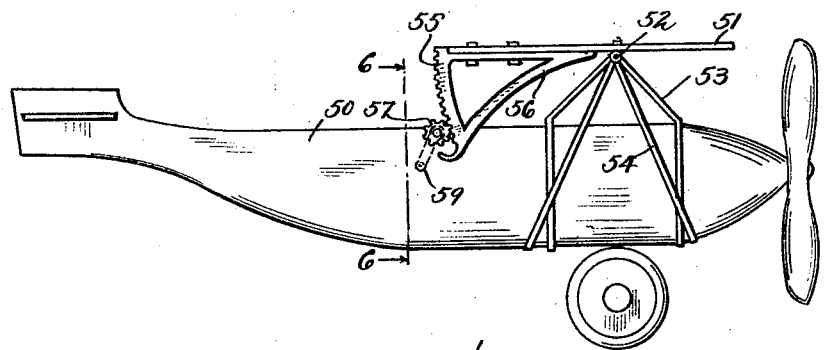
Figure 5 is a view similar to Figure 4 with another modified form of plane tilting means.
Figure 6:
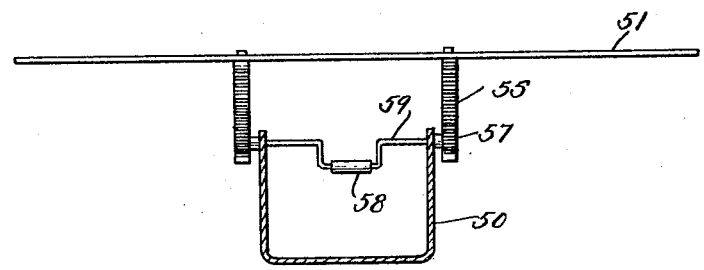
Figure 6 is an end view thereof, partly in section on line 6—6 of Figure 5.

In the form of my invention illustrated in Figures 5 and 6, the body 50 of the aeroplane has its wing or plane 51 tiltably secured, as at 52, to the strap arrangement 53, 54.

Toothed segments or segmental racks 55 are attached to the lower face of the plane 51 near the end thereof by means of brackets 56, and gears 57 engage said racks and are operated by means of a crank handle 58 arranged in the shaft 59 of the gears, so that by the proper manipulation of the handle 58 and shaft 59 the gears 57 will tilt the plane 51 as is evident at any desired angle to the body.

Figure 7:
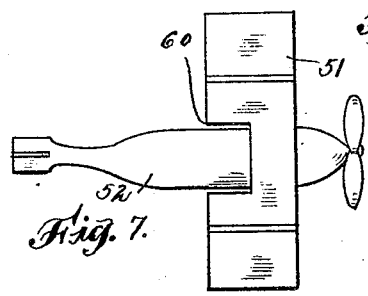
Figure 7 is a top plan view of an aeroplane according to my invention.

As illustrated in Figure 7 the plane 57 has a suitable recess 60 in approximately its middle and rear edge in order to allow a swinging and tilting of the plane without interference with the body.

The operation of my plane tilting means for aeroplanes will be entirely clear from the above description, when read on the drawings and need therefore no further explanation, it is however, to be understood, that I may make such changes in the general arrangement and in the construction of the minor details of my device as come within the scope of the appended claims, without departure from my invention.

Having this described my invention, what I claim as new, and desire to secure by Letters Patent is:

1. In an aeroplane, a plane, a strap arrangement tiltably connected to said plane and guided about the body of said plane, a cable connected with one end of said plane, means for operating said cable to tilt the plane about the strap arrangement, a second cable, also attached to said plane, and a means for operating said second cable to return the plane into its normal position.

2. An aeroplane comprising a body, a frame work comprising a plurality of straps forming a resting place for said body, said straps extending above the body, the upper ends of said straps united to form an apex, a wing above said body tiltably attached intermediate its ends to said apex, a means for tilting said wing about said apex, and a means for returning said wing into its normal position after each tilting operation.

3. In an aeroplane of the class described, the combination of the plane's body with a frame work or strap arrangement in which said body rests, a wing tiltably secured intermediate its ends to the apex of the frame work, a post attached to said body in rear of said frame work, a crank and pulley arrangement for operating a cable to tilt the wing, and a crank and pulley arrangement for operating a cable to return the wing into its normal position after its tilting.

4. In an aeroplane of the class described, a body, a framework composed of a plurality of straps surrounding said body and presenting at its bottom a resting place for said body, the upper ends of said straps united above said body to form an apex, a wing tiltably secured intermediate its ends to said apex, a vertical post on said body in rear of said frame work, a cable attached to the rear edge of said wing, means for guiding said cable, and a means for operating said cable to tilt said wing, a pulley on said post, a cable guided over said pulley, and a means on said body for operating said last named cable to return the wing into its normal position after each tilting operation.

Signed at Nekoosa in the county of Wood and State of Wisconsin.

JAKOB HOJNOWSKI.